Sept. 11, 1956 M. A. BOOTH 2,762,619
APPARATUS FOR PRODUCING HYDRAULIC CEMENT CLINKER
Filed Sept. 11, 1952
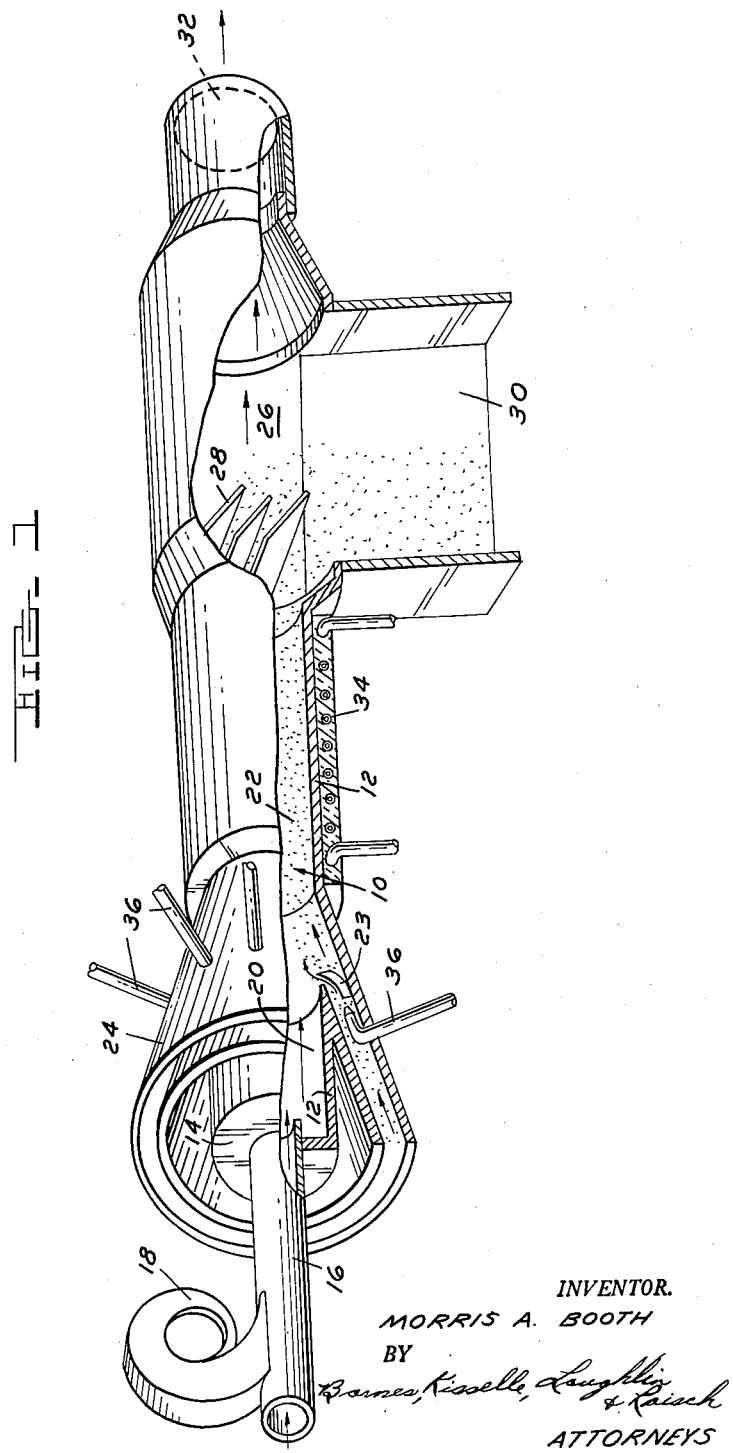
INVENTOR.
MORRIS A. BOOTH
BY
ATTORNEYS United States Patent Office 2,762,619
Patented Sept. 11, 1956

2,762,619

APPARATUS FOR PRODUCING HYDRAULIC CEMENT CLINKER

Morris A. Booth, Greenville, Mich.

Application September 11, 1952, Serial No. 309,071

3 Claims. (Cl. 263—21)

This invention relates to a method and apparatus for producing hydraulic cement clinker.

In the manufacture of Portland cement there is usually utilized very long rotary kilns some of which reach a length of 500 feet or more. These kilns are arranged on a slight incline, raw mix being introduced at one end, either in a dry state or in the form of a wet slurry, and a burner is arranged at the other end of the kiln for producing the necessary temperature to clinker the raw mix. The process of producing clinker by such means is relatively expensive, time consuming, and not subject to the precise control neecssary for producing the highest quality product.

It is an object of this invention to provide a method and apparatus by means of which raw mix for hydraulic cement can be converted into clinker much more economically and quickly than with cement kiln of present-day construction.

A further object of the invention is to provide a method and apparatus by means of which the process of converting the raw mix into clinker can be controlled very accurately.

More specifically, the invention contemplates a relatively small kiln in the form of a tubular cell provided with a burner at one end for producing a temperature in the neighborhood of 2700° F. which is necessary to produce clinker from the raw mix. Through this kiln there is conducted a gaseous stream of high velocity, a velocity sufficiently high to carry particles of raw mix in suspension. Adjacent the burner end of the tubular cell there are arranged means for introducing into the cell a stream or streams of raw mix, the arrangement being such that the raw mix is picked up by the gaseous stream of high velocity, heated thereby to produce clinker and conducted axially through the cell to the discharge end thereof wherein the clinker is precipitated from the gaseous stream. The flow of the hot gases and raw mix through the cell is unidirectional.

Referring to the drawing wherein a fragmentary sectional view of the apparatus of this invention is illustrated in a more or less diagrammatic way, there is shown a relatively small kiln which comprises a tubular passageway 10 defined by a cylindrical wall 12 and substantially closed at one end by an end wall 14. Opening into the end wall 14 is one or more burner structures 16 which include a blower 18. The burner is provided for producing the necessary heat for converting the raw mix into clinker and may take any of the several conventional forms. For example, the burner 16 can be in the form of a gas burner, an oil burner or a burner utilizing pulverized coal. The flame from the burner 16 projects into the adjacent end of the kiln and provides within the kiln a burning zone designated 20. In this zone of the kiln the fixed carbon in liquid or solid fuel is burned off and a certain amount of combustible gases, or unburned gases in the case of a gas burner, are produced. The blower 18 supplies the primary air necessary for combustion and may, if desired, supply an excess of air so as to provide all, or at least part, of the secondary air necessary for combustion.

The raw mix is introduced into the kiln either in the dry form or in the form of a wet slurry. This raw mix comprises the materials used in the manufacturing of Portland cement ground and blended to a very fine state, preferably such as to pass through 200 mesh screen. In the arrangement shown in the drawing, the raw mix is adapted to be introduced into the kiln in the dry state. Preheated air is used as the transporting media. The raw mix can, however, be sprayed or charged mechanically into the clinker firing zone 22 of the kiln. When preheated air is used the air can be utilized as the excess air necessary to complete combustion of the volatile combustible matter produced in the clinker firing zone 22 of the kiln. In the arrangement illustrated the raw mix is conducted into the kiln by means of a conically-shaped inlet duct 24 through which the mixture of powdered raw mix and preheated air is blown at a relatively high velocity. When wet slurry is used as the raw mix, suitable spray nozzles would be employed for introducing the mix into the kiln. In any event the means for introducing the raw mix, either wet or dry, are arranged such that the mix is picked up and carried axially through the kiln by the hot stream of gases flowing axially through the kiln. If desired, a spiral or helical flow of the mix through the kiln may be produced by incorporating deflection baffles such as at 23.

In the arrangement shown the velocity of the air and gases in the burning zone 22 necessarily has to be equal to or above the transport velocity for the raw mix being conveyed. This will enable burning or clinkering of the raw mix while in suspension and flowing axially through the kiln. It will be observed that whether the velocity through the kiln is produced by the blower 18 or by the air stream flowing through the conical duct 24 the flow of gaseous material and raw mix in suspension will be in a direction axially of the kiln toward the discharge end thereof. When the particles of raw mix in suspension come into contact with the hot gases and the radiant heat produced by the burner, these particles become heated and softened. As these heated and softened particles collide with one another in the clinker firing zone 22, they tend to adhere and fuse to each other and thereby produce clinker. This clinker is carried by the gaseous stream axially of the kiln to a precipitation zone 26 wherein the clinker is precipitated from the gaseous stream. The precipitator 28 may be of any conventional form such as a gravity precipitator or an electrostatic precipitator or any combinations thereof. The clinker precipitated in the zone 26 drops downwardly through a discharge chamber 30 into an air quench type cooler (not shown) where the clinker is rapidly cooled and conveyed away by suitable means for further processing.

The products of combustion are conducted axially out through the discharge end 32 of the kiln and conveyed to a boiler or other apparatus for utilizing the heat of such gases. The heat evolved in this process is further utilized by incorporating a water-cooler wall section 34 around a portion of the kiln corresponding to the zone of the kiln between the conical duct 24 and the precipitation zone 26.

In some types of cement special ingredients are added in order to produce a cement having specially desired properties such as, for example, quick setting, slow setting, etc. In the arrangement illustrated these chemicals can be very advantageously introduced into the raw mix in regulatable quantities by mixing them with the stream of raw mix as it flows into the kiln. For example, in the arrangement shown wherein the raw mix is introduced in the dry state, a plurality of nozzles 36 may be arranged within the conical duct 24 for discharging into the stream of raw mix flowing through duct 24 the desired chemicals. In the case of an arrangement wherein the raw mix is introduced in the wet state, it will be appreciated that a similar arrangement may be utilized for introducing the necessary chemicals into the raw mix stream flowing into the kiln.

It will thus be seen that the method and apparatus described herein for producing cement clinker possess several important advantages over the conventional methods and apparatus employed. In the first place, the apparatus here is of a much smaller size. The kiln may be as short as 20 to 30 feet in length as compared with conventional kilns which may be as much as 500 feet long. The obvious difference in the cost of the apparatus of the invention as compared with conventional kilns is highly significant.

In addition, it will be observed that in a conventional kiln the time required for the material to travel the length of the kiln is a matter of hours. In the kiln of the present invention the material passes therethrough in a matter of seconds. The clinkering operation is thus materially speeded. This is also important from another standpoint. When it is desired to change from one type of cement to another, it is an easy matter with a kiln of this invention to stop the operation and substitute a different raw mix. This is not true with conventional apparatus.

Still another desirable feature of the present invention is the facility with which the clinkering operation can be controlled. The apparatus is admirably suited for all types of measuring instruments such as thermostats, flow meters, etc.; and since the time interval required for the material to pass through the apparatus is relatively short, it will be appreciated that a change in the firing or in the flow of material or gases through the apparatus will produce an immediate change in the clinker being discharged. The reduction of time required for the clinkering operation is an all-important feature of this invention, and this is attributed to the fact that the particles of raw mix are burned while in suspension, thus presenting a maximum surface area for contact with the hot gases flowing axially through the kiln. These hot gases provide the transporting media for the particles of raw mix while they are being fired and for the clinker after it has formed.

I claim:

1. In an apparatus for producing cement clinker, the combination of a generally tubular member having a rectilinear axis and having an axial passageway forming a burning zone adjacent one end thereof, fuel burning means for producing a flame in said burning zone generally coaxially with the axis of said tubular member, means for conducting a high velocity gaseous stream axially through said tubular member from said burning zone, said axial passageway having an axial extension adjacent said burning zone forming a clinker firing zone spaced axially downstream from said burning zone, means arranged circumferentially around said tubular member for introducing a raw mix of cement under pressure into the path of said high velocity stream at said firing zone, said last mentioned means being arranged such that the raw mix will be picked up by said gaseous stream, heated thereby and conducted axially through said tubular member by said gaseous stream, and means spaced axially beyond said firing zone for separating from said gaseous stream the clinker formed.

2. The combination set forth in claim 1 including nozzle means in the path of travel of said raw mix stream for adding to said stream of raw mix blending chemicals as the raw mix is passing through said raw mix introducing means and prior to its introduction in said gaseous stream.

3. The combination set forth in claim 1 wherein said means for introducing raw mix comprise a generally conically shaped member and including nozzle means on said member for discharging blending chemicals into said raw mix as the raw mix is passing through said member in the direction of said gaseous stream.

References Cited in the file of this patent

UNITED STATES PATENTS

| | | |
|---|---|---|
| 1,622,337 | Naske | Mar. 29, 1927 |
| 1,639,967 | Reader | Aug. 23, 1927 |
| 2,130,154 | Riley | Sept. 13, 1938 |
| 2,364,199 | Deer | Dec. 5, 1944 |
| 2,455,666 | Fournier | Dec. 7, 1948 |
| 2,584,805 | Leftwick | Feb. 5, 1952 |
| 2,619,776 | Potters | Dec. 2, 1952 |
| 2,666,632 | Culver et al. | Jan. 19, 1954 |
| 2,673,081 | Fay et al. | Mar. 23, 1954 |
| 2,674,445 | Diehl | Apr. 6, 1954 |